(12) United States Patent
Schwarz

(10) Patent No.: US 6,641,325 B2
(45) Date of Patent: Nov. 4, 2003

(54) PLATE UNIT MOUNTING SYSTEM UTILIZING SPRING CLIPS FOR ADJUSTABLY AND DETACHABLY MOUNTING ITEMS

(75) Inventor: Helmut Schwarz, Weil der Stadt (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 09/963,379

(22) Filed: Sep. 27, 2001

(65) Prior Publication Data

US 2002/0039518 A1 Apr. 4, 2002

(30) Foreign Application Priority Data

Sep. 29, 2000 (DE) .......................... 200 16 889

(51) Int. Cl.⁷ ............................... F16B 21/00
(52) U.S. Cl. .................. 403/329; 403/326; 403/3; 403/4; 403/388
(58) Field of Search .................. 403/315–319, 403/326, 328, 329, 291, 353, 376, 3, 4, 388, 389; 411/349, 352, 999, 991–994; 248/220.22, 222.12, 223.41; 52/489.1, 2, 506.05; 244/118.5

(56) References Cited

U.S. PATENT DOCUMENTS 2,200,702 A * 5/1940 Oddie 5,118,234 A * 6/1992 Norkus .................. 411/182

FOREIGN PATENT DOCUMENTS

| DE | 3842229 | 6/1989 |
| DE | 4138047 | 6/1992 |
| DE | 29716096 | 12/1997 |
| DE | 29920497 | 3/2000 |
| DE | 4138047 | 9/2001 |
| EP | 609956 A1 * | 8/1994 |

* cited by examiner

Primary Examiner—Lynne H. Browne
Assistant Examiner—Michael P Ferguson
(74) Attorney, Agent, or Firm—Greenblum & Bernstein, P.L.C.

(57) ABSTRACT

System for connecting a first element to a second element comprising a base plate adapted to be adjustably attached to the first element. The base plate comprises a mechanism for allowing the base plate to move with respect to the first element substantially along a first direction. A retaining plate is adapted to be attached to the second element. The retaining plate comprises a mechanism for allowing the retaining plate to move with respect to the base plate substantially along a second direction. The retaining plate is adjustably attached to the base plate. The first direction is different from the second direction.

23 Claims, 5 Drawing Sheets

PLATE UNIT MOUNTING SYSTEM UTILIZING SPRING CLIPS FOR ADJUSTABLY AND DETACHABLY MOUNTING ITEMS

CROSS-REFERENCE TO RELATED APPLICATIONS

The present application claims priority under 35 U.S.C. §119 of German Patent Application No. 200 16 889.4, filed on Sep. 29, 2000, the disclosure of which is expressly incorporated by reference herein in its entirety.

BACKGROUND OF THE INVENTION

1. Field of the Invention

The invention concerns a plate unit mounting system which is adjustable in each of the X and Y coordinate directions. The mounting system has particular application for mounting wall-paneling elements or similar items detachably to other structures via spring clips.

2. Discussion of Background Information

Plug-in connection elements utilizing spring clips are known to be used for mounting wall-paneling elements, especially those used in aircraft and other vehicles. For example, DE 41 38 047 discloses a spring-clip connection which utilizes a retaining socket-pin 2-1 that is joined to a first part and that is engaged in a retaining spring 2-2 mounted on a second part. This prior art device is shown in FIG. 2. The retaining spring used in this prior art device has a profile which is similar to a ridge roof and has free spring arms pointing towards the ridge.

German utility model 297 16 096.6 discloses a quick fastening system which utilizes a retaining spring 3-1 and a pointed retaining socket-pin 3-2 that has lateral notches at a free end. The retaining spring is a bent triangular leaf spring having a hole at a center of a base part which allows a pin to pass through. This prior art device is shown in FIG. 3.

German utility model 299 20 497.9 discloses a vibration-damping detachable connection arrangement for two components MP1 and MP2. The arrangement uses a retaining rotating socket-pin 4-1, a retaining spring 4-2 and a vibration-damping ring 4-3. This prior art device is shown in FIG. 4. The retaining socket-pin in this arrangement is pointed at its free end and has two lateral notches into which the two resilient ends of the ridge-roof shaped leaf spring (retaining spring) fit. A vibration-damping ring is provided of elastic material and has a peripheral groove N in which the first component MP1 is supported. The retaining socket-pin is guided in a sleeve which is located in the opening of the vibration-damping ring. The connection can be released by turning the pin, thus causing the arms of the retaining spring 4-2 to expand outwardly.

In all these known arrangements, the wall-paneling elements are joined only to the particular part for which they are intended by means of the spring clip joint.

SUMMARY OF THE INVENTION

The invention is therefore directed to a system for connecting and/or mounting one or more wall-paneling elements to a wall via spring-clip connections and which allows for at least two position adjustments such as in the X/Y directions and/or coordinates.

Accordingly, the invention provides a system for connecting a first element to a second element wherein the system comprises a base plate adapted to be adjustably attached to the first element. The base plate comprises a mechanism for allowing the base plate to move with respect to the first element substantially along a first direction. A retaining plate is adapted to be attached to the second element. The retaining plate comprises a mechanism for allowing the retaining plate to move with respect to the base plate substantially along a second direction. The retaining plate is adjustably attached to the base plate. The first direction is different from the second direction.

The first direction may be approximately orthogonal to the second direction. The mechanism for allowing the base plate to move with respect to the first element may comprise at least one opening arranged on the base plate. The at least one opening arranged on the base plate may comprise a slot. The slot may be arranged approximately parallel to the first direction. The at least one opening may comprise at least two slots arranged on the base plate.

The mechanism for allowing the retaining plate to move with respect to the base plate may comprise at least one opening arranged on the retaining plate. The at least one opening arranged on the retaining plate may comprise a slot. The slot may be arranged approximately parallel to the first direction. The at least one opening may comprise at least two slots arranged on the retaining plate. The first element may comprise a wall and the second element may comprise at least one of a covering plate and a wall panel.

The system may further comprise at least one retaining spring mounted to the retaining plate. The at least one spring may be adapted to engage at least one pin that is coupled to the second element. The at least one spring may comprise a gap and at least two resilient arms. The gap may be oriented approximately parallel to the second direction. The gap may comprise a width and a length that is greater than the width, the length being oriented approximately parallel to the second direction. At least one of the base plate and the retaining plate may comprise at least one through opening which is adapted to receive at least one of a retaining spring and a pin. Each of the base plate and the retaining plate may comprise at least one through opening, whereby the at least one opening of the base plate is adapted to receive a retaining spring and the at least one opening of the retaining plate is adapted to receive both the retaining spring and a pin. Each of the base plate and the retaining plate may comprise a plurality of through openings, whereby each opening of the base plate is adapted to receive a retaining spring and each opening of the retaining plate is adapted to receive both the retaining spring and a pin. The at least one opening may be disposed in the retaining plate and may comprise a slot. The slot may be arranged approximately parallel to the second direction.

The system may further comprise a mechanism for determining an alignment position between the base plate and the retaining plate. The mechanism for determining an alignment position may comprise an opening arranged in each of the base plate and the retaining plate, whereby an alignment of the opening in the base plate with the opening of the retaining plate indicates a central alignment position. The base plate may comprise a plurality of recesses, at least one of which is adapted to accommodate a retaining spring. The retaining plate may comprise at least hook, whereby the at least one hook is adapted to be coupled to an end of a safety cord.

The invention also provides for a system for connecting a first element to a second element wherein the system comprises a base plate adapted to be adjustably attached to the first element. The base plate comprises a mechanism for allowing the base plate to move with respect to the first element substantially along a first direction. A retaining plate is adapted to be attached to the second element. The retaining plate comprises a mechanism for allowing the retaining plate to move with respect the base plate substantially along a second direction. At least one retaining spring is attached to the retaining plate. The at least one retaining spring is adapted to engage a pin that is coupled to the second component. The retaining plate is adjustably attached to the base plate. The first direction is different from the second direction.

The invention also provides for a system for connecting a first element to a second element wherein the system comprises a base plate adapted to be adjustably attached to the first element. The base plate comprises a mechanism for allowing the base plate to move with respect to the first element substantially along a first direction. A retaining plate is adapted to be attached to the second element. The retaining plate comprises a mechanism for allowing the retaining plate to move with respect to the base plate substantially along a second direction. At least one retaining spring is attached to the retaining plate. The at least one retaining spring is adapted to engage a pin that is coupled to the second component. The retaining plate is adjustably attached to the base plate. The first direction is approximately orthogonal to the second direction.

BRIEF DESCRIPTION OF THE DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
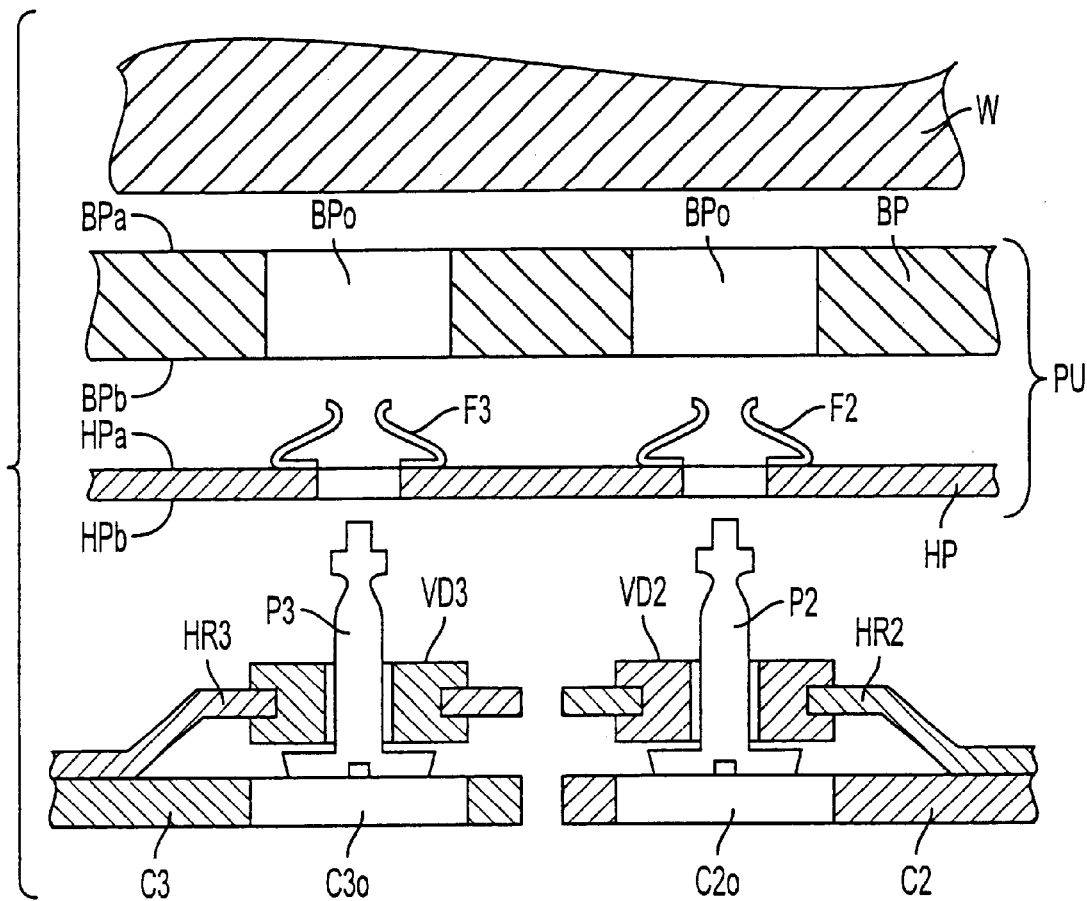
FIG. 1 shows an exploded schematic view of the system in which a plate unit is located between a wall and wall-paneling elements. The system uses retaining springs and retaining socket-pins.
Figure 2:
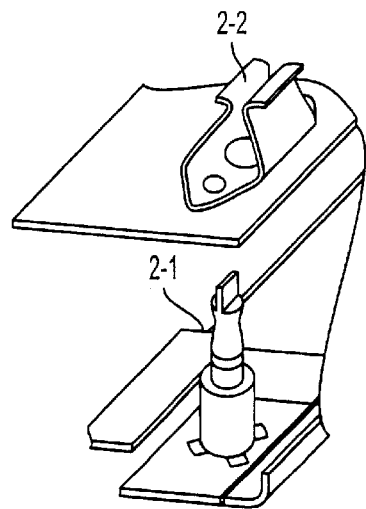
FIG. 2 shows a prior art arrangement which utilizes a retaining spring and a retaining socket-pin which may be used for attaching wall-paneling elements in aircraft and vehicles.
Figure 3:
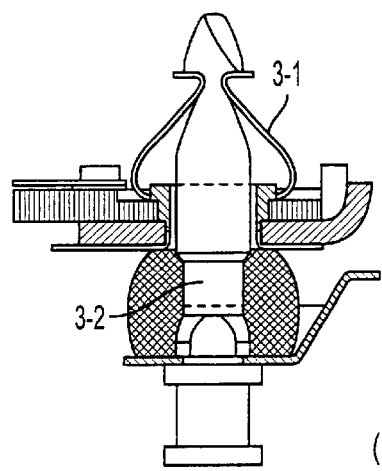
FIG. 3 shows another prior art arrangement utilizing retaining spring and retaining socket-pin.
Figure 4:
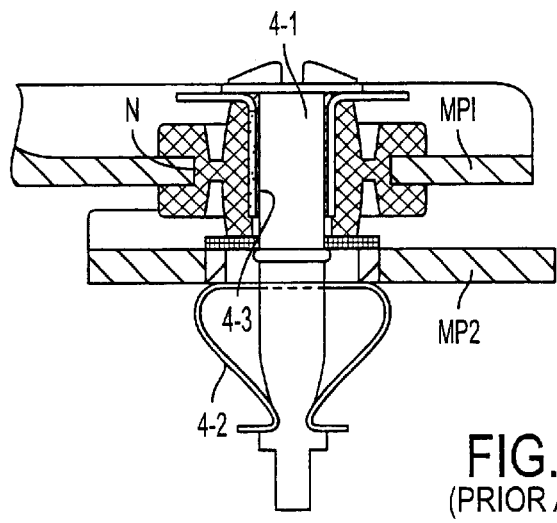
FIG. 4 shows still another prior art arrangement utilizing a retaining spring, a retaining socket-pin, and a vibration-damping ring.

FIG. 1 shows schematically a plate unit PU which is located between a wall W and one or more covering plates C2 and C3. Each of the covering plates C2 and C3 have corresponding retaining elements HR2 and HR3 attached thereto. Each of the retaining elements HR2 and HR3 have mounted thereto a corresponding socket pins P2 and P3. The plate unit PU includes a plate part HP (hereinafter called retaining plate HP) and a base plate BP. Four retaining springs F1–F4 (of which only two are shown in FIG. 1) are secured to the retaining plate HP. The retaining plate HP and the base plate BP may be joined and/or secured to one another by any conventional arrangement such as, e.g., by screws. The retaining plate B also has a top side HPa and a bottom side HPb. The base plate BP also has a top side BPa and a bottom side BPb. As can be seen in FIG. 1, the top side BPa of the base plate BP faces the wall W, the bottom side BPb of the base plate BP faces the top side HPa of the retaining plate HP, and the bottom side HPb of the retaining plate faces the covering plates C2 and C3.

The base plate BP also has a number of openings BPo (only two or which are shown) which correspond to and/or are approximately aligned with the retaining springs F1–F4. These opts BPo are adapted to receive at least some of the retaining springs F1–F4 (see FIG. 5) as well as the pins P1–P4.

Each covering plate C2 and C3 also has corresponding openings C2o and C3o (only one of which are shown per plate C2 and C3) which are approximately aligned with the retaining springs F1–F4 and/or openings BPo. These openings C2o and C3o allow access to the pins B1–B4. Each pin B1–B4 is secured to a corresponding covering plate C2 and C3 via corresponding retaining elements HR1–HR4 (only two of which are shown, i.e., HR2 and HR3). Corresponding mounting rings or bushings such as, e.g., vibration-dampers VD1–VD4 (only two of which are shown, i.e., VD2 and VD3), are utilized to mount the pins P1–P4 to the corresponding retaining elements HR1–HR4.

Figure 5:
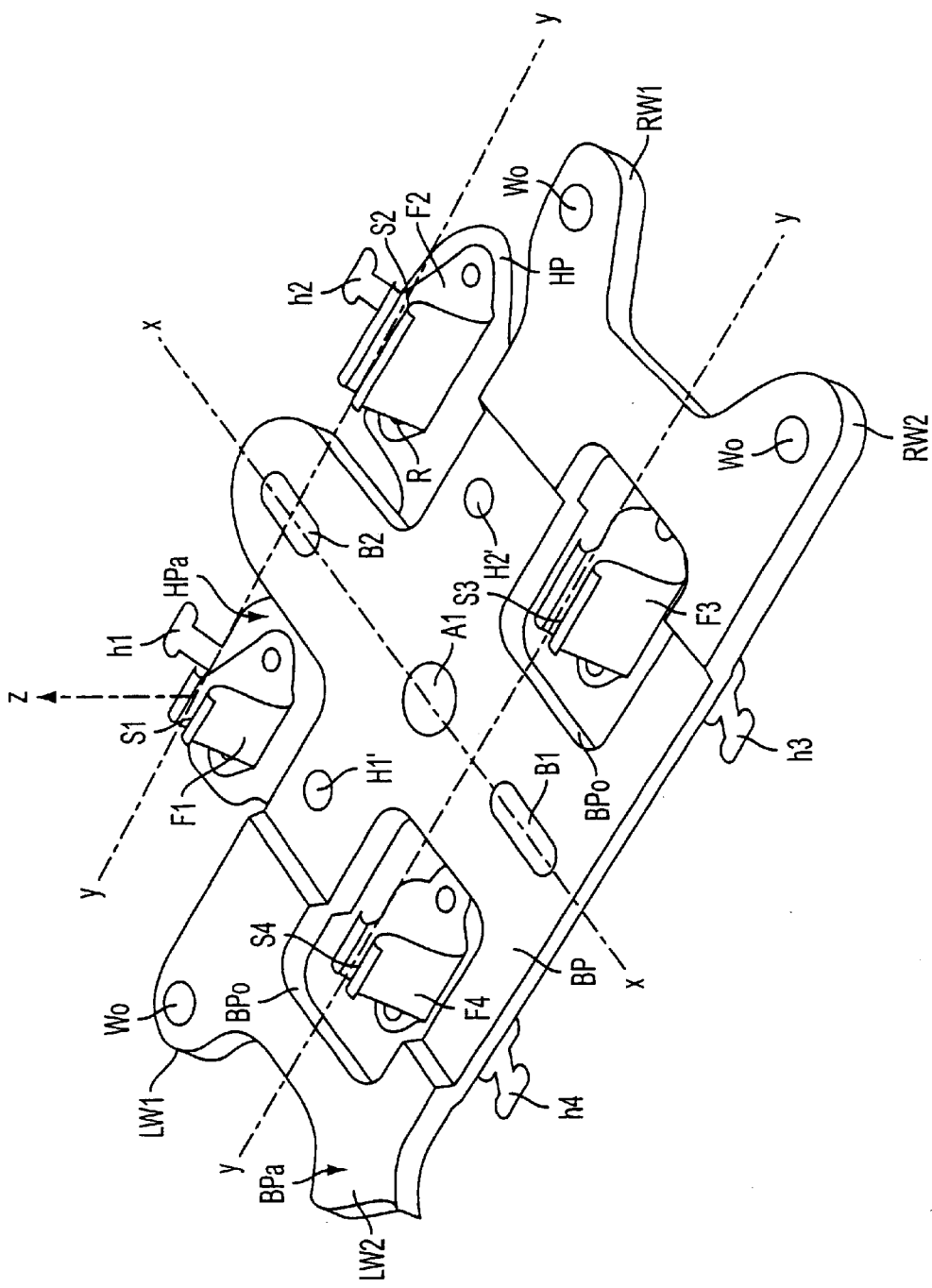
FIG. 5 shows a perspective view from the top side of the system according to the invention. A plate unit is shown along with a base plate and a retaining plate having retaining springs.

FIG. 5 shows a top perspective view of how the base plate BP and the retaining plate HP can be connected to form the plate unit PU. The base plate BP is shown arranged above the retaining plate HP with two retaining springs F3 and F4 being respectively received within openings BPo in the base plate BP.

The base plate BP is a plate-like member and has a central part which includes openings B1, A1, and lateral side parts extending laterally from the central part. A left lateral side part includes wing portions LW1 and LW2 which each have connecting openings Wo and a right lateral side part has wing portions RW1 and RW2 which each have connecting openings Wo. The base plate BP also includes a central extension part which includes slot-like opening B2. A number of openings H1' and H2' are also arranged in an area of the central part of the base plate BP. These openings H1' and H2' are configured to receive screws H1" and H2" (see FIG. 6) or other connecting mechanisms for securing the base plate BP to the retaining plate HP.

As can also be seen in FIG. 5, the four retaining springs F1–F4 can be connected to and/or secured to the upper side HPa of the retaining plate HP via rivets R. Of course, other convention connection mechanisms may be utilized such as adhesives, welding, fasteners of various types, etc.

Figure 6:
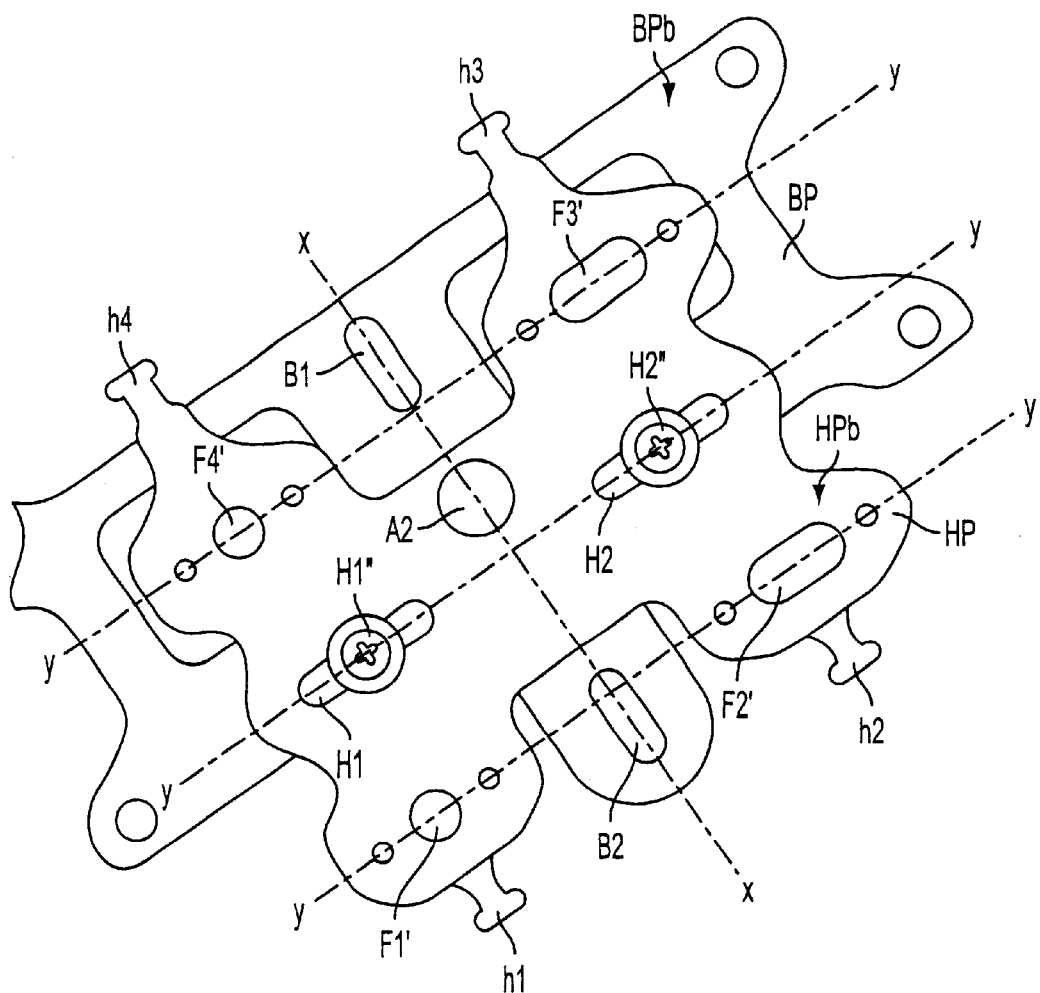
FIG. 6 shows a perspective view from the bottom side of the system according to the invention.

FIG. 6 shows a perspective view of the bottom side of the plate unit in which the bottom sides HPb and BPb of the retaining plate HP and the base plate BP are respectively shown. The base plate BP is joined and/or secured to the retaining plate HP shown below it by way of screws H1" and H2".

The retaining plate HP is also a plate-like member and has a central part which includes an opening A2 which may be aligned with opening A1 in the base plate BP (see FIG. 5). The retaining plate HP also includes lateral side parts which extend laterally from the central part. A left lateral side part includes two spring retaining portions in which an upper spring retaining portion has an opening F4' and a hook h4 as well as a lower spring retaining portion that includes opening F1' and a hook h1. A right lateral side part also includes two spring retaining portions in which an upper spring retaining portion has an opening F3' and hook h3 as well as a lower spring retaining portion that includes opening F2' and hook h2.

The retaining plate HP includes slot-like openings H1 and H2 which are arranged in an area of the lateral side parts of the retaining plate HP. These openings H1 and H2 are configured to receive screws H1" and H2" or other connecting mechanisms for adjustably securing the retaining plate HP to the base plate BP.

The design of the two plates BP and HP is such that two-way adjustment is possible. In this regard, the two slots H1 and H2 are aligned in a direction Y on the retaining plate HP. Accordingly, this means that when the screws H1" and H2" are released and/or loosened, the retaining plate HP is allowed to move in a direction Y with reference to the base plate BP. Additional position adjustment is provided by the base plate BP. This is provided by the two slots B1 and B2 which are aligned in a direction X. These slots B1 and B2 allow the base plate BP to be adjustably attached to the wall W, e.g., by way of screws (not shown). Accordingly, this means that when the screws (not shown) attaching the base plate BP to the wall W are released and/or loosened, the base plate BP is allowed to move in a direction X with reference to the wall W.

The system also has a configuration which is characterized by the screws H1" and H2" being in a position that is aligned with the center of the slots H1 and H2, i.e., a center zero position. In this position, the opening A1 of the base plate BP is aligned and/or arranged concentrically with the opening A2 of the retaining plate HP. The alignment of holes A1 and A2 is useful for allowing visual verification of the center zero position. Of course, other mechanisms may be utilized to determine such positioning such as, e.g., visual markings, centering pins and projections, centering indentations, etc.

As discussed above, the slots B1 and B2 of the base plate BP are aligned in a direction X, and the slots H1 and H2 of the retaining plate HP are aligned in a direction Y. This configuration allows for X and Y adjustment in these orthogonal co-ordinate directions of the plate unit PU, i.e., by utilizing this arrangement, the slots B1 and B2 of the base plate BP are adjustable in a direction X, and the slots H1 and H2 of the retaining plate HP are adjustable in a direction Y. However, it should be noted that the invention also contemplates a slot arrangement wherein the slots of the base plate BP are aligned in a direction Y, and the slots of the retaining plate HP are aligned in a direction X.

With reference to FIG. 5, it is seen that the retaining springs F1, F2, F3 and F4 are mounted (e.g., by rivets) on the top side HPa of the retaining plate HP at imaginary corner points of a rectangle which is aligned in the X/Y direction. These retaining springs F1–F4 have a form which resembles a ridge roof that has an open ridge gap. The springs F1–F4 also have leaf-spring arms which are inclined towards one another and these arms are designed to be resilient. This spring design allows the spring arms to be expanded when, for example, a retaining socket-pin P1–P4 is pushed through their corresponding gaps S1–S4 in a direction Z. The ends of the spring arms are preferably designed such that they lock into lateral notches formed in the pins P1–P4 in order to create a connection (see e.g., FIG. 7). This connection between the pins P1–P4 and the springs F1–F4 is of course preferably made releasable by any known mechanism such as the rotatable release connection mechanism shown in FIG. 7.

According to the embodiment shown in FIGS. 5–6, all gaps S1–S4 of the retaining springs F1–F4 are shown aligned in a direction Y, i.e., the gaps S1–S4 lie in the same direction of alignment.

However, this embodiment may also provide that the retaining springs F1 and F4 have a shorter gap (i.e., measured in the direction Y) than the retaining springs F2 and F3. Additionally, it is preferred that the base of the retaining springs F1–F4 have openings (see FIG. 1) which are aligned with through-openings F1', F2', F3' and F4' of the retaining plate HP.

As shown in FIG. 6, the openings F1' and F4' may be circular holes while the openings F2' and F3' may be slots which run in a direction Y. This arrangement and/or design allows the retaining socket-pins that are disposed in the openings F2' and F3' to be moved in a direction Y, i.e., movement in the direction Y within the gap of the retaining springs F2 and F3. In this way, it is possible to compensate any shift in the cover plates C2 and C3 which may sometimes occur.

Figure 7:
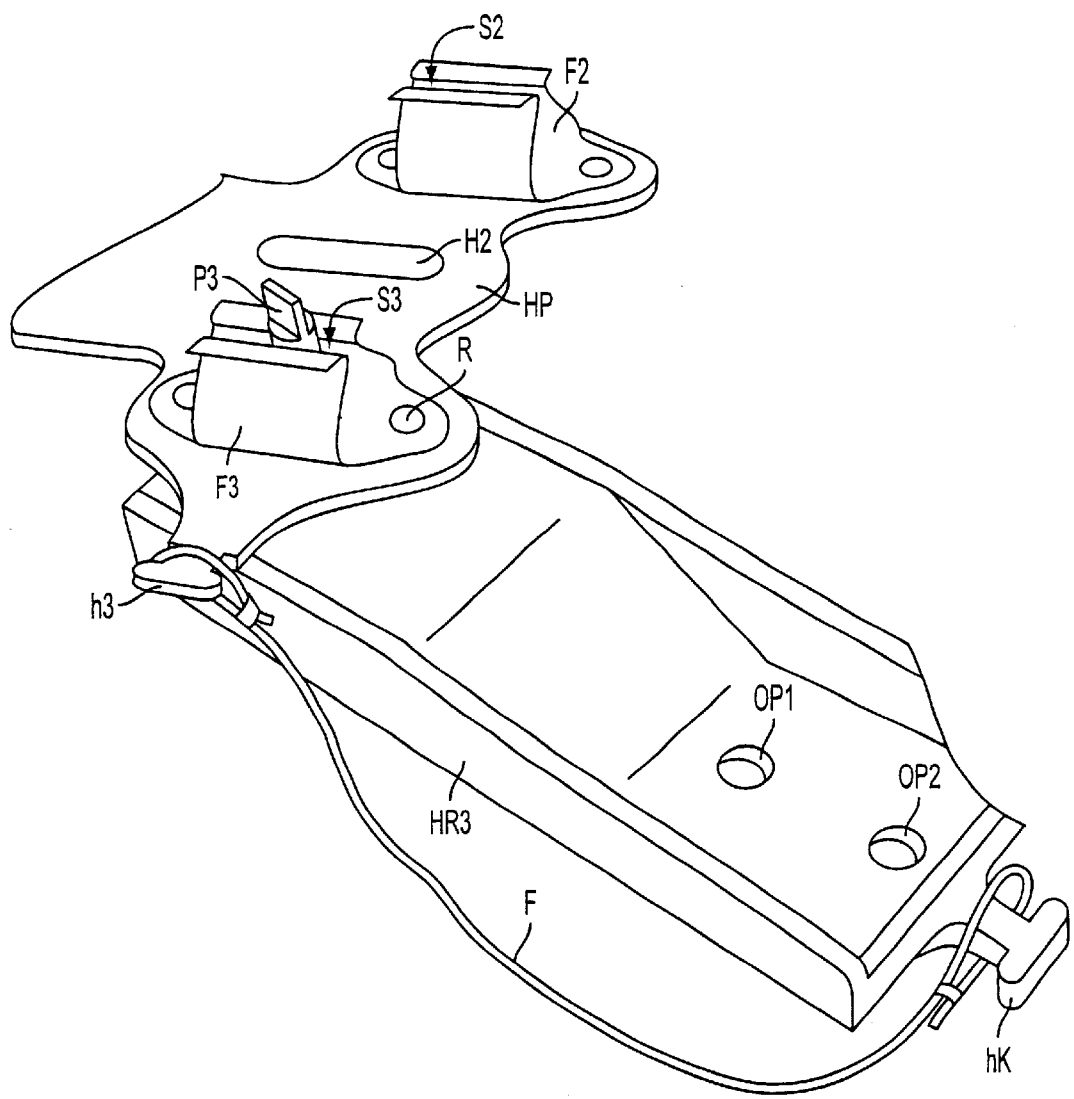
FIG. 7 shows a perspective view illustrating a detail portion of a connection joint between the retaining socket-pin of a retainer (which is attached to a non-illustrated wall-paneling element) with the retaining spring of a retaining plate.

FIG. 7 shows in detail a perspective view of one connection between the retainer HR3, which can be attached to a wall-paneling element (not shown) via openings OPi and OP2, and the retaining plate HP. As is clearly shown, the retainer HR3 is connected to the retaining plate HP via a retaining socket-pin P3 which is engaged by a retaining spring F3. This connection was formed by pushing the retaining socket-pin P3 through the opening F3' (see FIG. 6) and into the retaining spring F3 until its spring arms lock into the notches of the pin P3.

As discussed above, the retainer HR3 has two holes OP1 and 0P2 for attaching to a wall-paneling element such as the covering plates C2 and C3. Access to the head of the retaining socket-pins remains possible via openings C2o and C3o (see FIG. 1) in order to release the connection. However, it should be noted that the invention contemplates a system wherein it is possible to dispense with the retainers (i.e., HR1–HR4) altogether. According to this variant, the retaining socket pins P1–P4 can be mounted directly to the wall-paneling elements without the need for retaining elements HR1–HR4.

The system and/or plate unit PU according to the invention permits, among other things, a quick and accurate adjustment of quadrant-shaped wall-paneling elements (or similar items) which meet at a common corner point. In this regard, devices may be utilized to prevent a loosened panel element from falling when the connection between the spring and the retaining socket-pin is released. Such devices may be in the form of a safety cord F (see FIG. 7) which has a loop at each end, one of which is hooked onto a hook hk of the retainer HR3 (or of a wall-paneling element), and another end of which is connected to a hook h3 of the retaining plate HP. The cord F also allows two-handed adjustment of the plate unit PU, as its length guarantees sufficient clearance between the plate unit PU and he retainer HR3.

The materials from which the various elements described herein may be made or formed will now be described, However, it should be noted that the invention is not limited to the materials disclosed herein and other materials may be utilized which are fit for the intended purpose. Thus, the invention provides that the base plate BP may be made of, e.g., a metal or synthetic material, with the metal being e.g., aluminum and with the synthetic material being e.g., a polyetherimid. It is prefered that the base plate BP be made of a synthetic material. The retaining plate HP may be made of, e.g., a metal or synthetic material, with the metal being e.g., aluminum and with the synthetic material being e.g., a polyetherimid. It is prefered that the retaining plate HP be made of aluminum. The retaining elements HR1–HR4 may be made of, e.g., a metal or synthetic material, with the metal being e.g., aluminum and with the synthetic material being e.g., a polyetherimid. It is preferred that the retaining elements HR1–HR4 be made of a synthetic material. The vibration dampers VD1–VD4 may be made of, e.g., an elastomer, with silicone being a preferred material. The retaining springs F1–F4 may be made of, e.g., a metal or synthetic material such as polyamidimid, with spring steel being a preferred material. Finally, the socket pins P1–P4 may be made of, e.g., a metal or synthetic material, with a metal such as rustfree steel or brass being preferred materials. If the socket pins are made of synthetic material, it is preferred that they be made of e.g., polyetherimid or polyamidimid. By way of background, polyamidimides are polymers having the following basic structure:

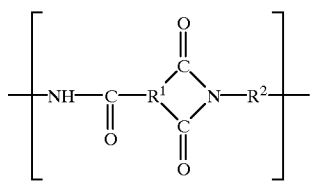

Of course, the materials of any of the other elements may also be those which fit their intended purpose.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A system for connecting a first element to a second element, the system comprising:
    a base plate adapted to be adjustably attached to a surface of the first element, the base plate comprising a mechanism for allowing the base plate to move with respect to the first element substantially along a first direction;
    a retaining plate adapted to be attached to the second element, the retaining plate comprising a mechanism for allowing the retaining plate to move with respect to the base plate substantially along a second direction;
    the retaining plate being adjustably attached to the base plate;
    the first direction being different from the second direction;
    each of the first and second directions being parallel to the surface of the first element;
    the base plate comprising through openings;
    the retaining plate comprising through openings; and
    springs coupled to the retaining plate,
    wherein the springs extend through the through openings of the base plate when the first element is connected to the second element.

2. The system of claim 1, wherein the first direction is approximately orthogonal to the second direction.

3. The system of claim 1, wherein the mechanism for allowing the base plate to move with respect to the first element comprises at least one additional opening arranged on the base plate.

4. The system of claim 3, wherein the at least one additional opening arranged on the base plate comprises a slot.

5. The system of claim 4, wherein the slot is arranged approximately parallel to the first direction.

6. The system of claim 3, wherein the at least one additional opening comprises at least two additional openings, at least one of the at least two additional openings being a slot.

7. The system of claim 1, wherein the mechanism for allowing the retaining plate to move with respect to the base plate comprises at least one additional opening arranged on the retaining plate.

8. The system of claim 7, wherein the at least one additional opening arranged on the retaining plate comprises a slot.

9. The system of claim 8, wherein the slot is arranged approximately parallel to the second direction.

10. The system of claim 7, wherein the at least one additional opening comprises at least two slots arranged on the retaining plate.

11. The system of claim 1, wherein the first element comprises a wall and wherein the second element comprises at least one of a covering plate and a wall panel.

12. The system of claim 1, wherein the springs are adapted to engage pins coupled to the second element.

13. The system of claim 1, wherein each of the springs comprises a gap and at least two resilient arms.

14. The system of claim 13, wherein the gap is oriented approximately parallel to the second direction.

15. The system of claim 13, wherein the gap comprises a width and a length that is greater than the width, the length being oriented approximately parallel to the second direction.

16. The system of claim 1, wherein each through opening of the base plate is adapted to receive one of the springs and each through opening of the retaining plate is adapted to receive a pin.

17. The system of claim 1, wherein the mechanism for allowing the retaining plate to move with respect to the base plate comprises a slot arranged approximately parallel to the second direction.

18. The system of claim 1, further comprising a mechanism for determining an alignment position between the base plate and the retaining plate.

19. The system of claim 18, wherein the mechanism for determining an alignment position comprises an additional opening arranged in each of the base plate and the retaining plate, whereby an alignment of the additional opening in the base plate with the additional opening of the retaining plate indicates a central alignment position.

20. The system of claim 1, wherein the retaining plate comprises at least one hook, whereby the at least one hook is adapted to be coupled to an end of a safety cord.

21. A system for connecting a first element to a second element, the system comprising:
    a base plate adapted to be adjustably attached to a surface of the first element, the base plate comprising a mechanism for allowing the base plate to move with respect to the first element substantially along a first direction;
    a retaining plate adapted to be attached to the second element, the retaining plate comprising a mechanism for allowing the retaining plate to move with respect to the base plate substantially along a second direction;
    at least one retaining spring attached to the retaining plate, the at least one retaining spring being adapted to engage a pin that is coupled to the second element;

the retaining plate being adjustably attached to the base plate;

the first direction being different from the second direction;

each of the first and second directions being parallel to the surface of the first element;

the base plate comprising through openings; and the retaining plate comprising through openings, wherein the at least one retaining spring extends through one of the through openings of the base plate when the first element is connected to the second element.

22. A system for connecting a first element to a second element, the system comprising:

a base plate adapted to be adjustably attached to a surface of the first element, the base plate comprising a mechanism for allowing the base plate to move with respect to the first element substantially along a first direction;

a retaining plate adapted to be attached to the second element, the retaining plate comprising a mechanism for allowing the retaining plate to move with respect to the base plate substantially along a second direction;

at least one retaining spring attached to the retaining plate, the at least one retaining spring being adapted to engage a pin that is coupled to the second element;

the retaining plate being adjustably attached to the base plate;

the first direction being approximately orthogonal to the second direction;

each of the first and second directions being parallel to the surface of the first element;

the base plate comprising at least one through opening; and the retaining plate comprising at least one through opening, wherein the at least one retaining spring extends through the at least one through opening of the base plate when the first element is connected to the second element.

23. A system for connecting a cover plate to a wall, the system comprising:

a base plate adapted to be adjustably attached to a surface of the wall, the base plate comprising at least one slot for allowing the base plate to move with respect to the wall substantially along a first direction;

a retaining plate adapted to be removably attached to the cover plate, the retaining plate comprising at least one slot for allowing the retaining plate to move with respect to the base plate substantially along a second direction;

the retaining plate being adjustably attached to the base plate;

the first direction being different from the second direction;

each of the first and second directions being at least one of parallel to each other and parallel to the surface of the wall;

the base plate comprising through openings;

the retaining plate comprising through openings; and retaining springs coupled to the retaining plate, wherein the retaining springs extend through the through openings of the base plate when the cover plate is connected to the wall.

* * * * *